United States Patent
Pahan

(10) Patent No.: US 12,514,842 B2
(45) Date of Patent: Jan. 6, 2026

(54) USE OF A BENZOATE CONTAINING COMPOSITION TO TREAT NEURODEGENERATIVE DISORDERS

(71) Applicant: Rush University Medical Center, Chicago, IL (US)

(72) Inventor: Kalipada Pahan, Skokie, IL (US)

(73) Assignee: Rush University Medical Center, Chicago, IL (US)

( * ) Notice: Subject to any disclaimer, the term of this patent is extended or adjusted under 35 U.S.C. 154(b) by 1030 days.

(21) Appl. No.: 17/627,391

(22) PCT Filed: Jul. 13, 2020

(86) PCT No.: PCT/US2020/041849
§ 371 (c)(1),
(2) Date: Jan. 14, 2022

(87) PCT Pub. No.: WO2021/011500
PCT Pub. Date: Jan. 21, 2021

(65) Prior Publication Data
US 2022/0313646 A1    Oct. 6, 2022

Related U.S. Application Data

(60) Provisional application No. 62/874,625, filed on Jul. 16, 2019.

(51) Int. Cl.
*A61K 31/235* (2006.01)
*A61K 9/00* (2006.01)
*A61K 47/24* (2006.01)
*A61P 25/28* (2006.01)

(52) U.S. Cl.
CPC .......... *A61K 31/235* (2013.01); *A61K 9/0053* (2013.01); *A61K 9/006* (2013.01); *A61K 9/0078* (2013.01); *A61K 47/24* (2013.01); *A61P 25/28* (2018.01)

(58) Field of Classification Search
None
See application file for complete search history.

(56) References Cited

U.S. PATENT DOCUMENTS

| | | | |
|---|---|---|---|
| 2005/0250812 A1 | 11/2005 | Pratt | |
| 2016/0331714 A1* | 11/2016 | Pahan | A61P 13/00 |
| 2017/0003280 A1 | 1/2017 | Akassoglou et al. | |

FOREIGN PATENT DOCUMENTS

| WO | 0190063 A2 | 11/2001 |
|---|---|---|
| WO | 2007007105 A1 | 1/2007 |
| WO | 2015109215 A1 | 7/2015 |
| WO | 2017/160629 A1 | 9/2017 |
| WO | 2019/070478 A1 | 4/2019 |

OTHER PUBLICATIONS

European Patent Office, Extended European Search Report, European Patent Application No. 20840690.0, date Jun. 30, 2023, 9 pp.
United States Patent & Trademark Office, The International Search Report and The Written Opinion Issued in corresponding International application No. PCT/US2020/041849, dated Oct. 8, 2020, 8 pp.
Van Der Burg, J.M., et al., Beyond the brain: widespread pathology in Huntington's disease, The Lancet Neurology, 2009, vol. 8, issue 8, pp. 765-774; retrieved from the internet:<DOI:10.1016/s 1474-4422(09)70178-4>, see entire document, especially, p. 765-766, 771.
The International Bureau of WIPO, International Preliminary Report on Patentability issued in corresponding International application No. PCT/US2020/041849, dated Jan. 27, 2022, 7 pp.

* cited by examiner

*Primary Examiner* — Adam C Milligan
*Assistant Examiner* — Jed A Kucharczk
(74) *Attorney, Agent, or Firm* — Taft Stettinius & Hollister LLP; Jessamine G. Pilcher

(57) ABSTRACT

The present disclosure generally relates to improved pharmaceutical compositions useful for the treatment of diseases and disorders. More particularly, the disclosure relates to pharmaceutical compositions comprising glyceryl tribenzoate and/or glyceryl dibenzoate for the treatment of neurodegenerative disorders and peripheral diseases.

6 Claims, 6 Drawing Sheets

USE OF A BENZOATE CONTAINING COMPOSITION TO TREAT NEURODEGENERATIVE DISORDERS

This application is a national stage application of International Application No. PCT/US2020/041849, filed Jul. 13, 2020, which claims priority to and takes the benefit of U.S. Provisional Patent Application No. 62/874,625 filed on Jul. 16, 2019, the contents of which are herein incorporated by reference.

FIELD OF THE INVENTION

The present disclosure generally relates to improved pharmaceutical compositions useful for the treatment of diseases and disorders. More particularly, the disclosure relates to pharmaceutical compositions comprising glyceryl tribenzoate and/or glyceryl dibenzoate for the treatment of neurodegenerative disorders and peripheral diseases.

BACKGROUND OF THE INVENTION

Cinnamon, the brown bark of cinnamon tree, is a commonly used spice and flavoring material for dessert, candies, chocolate etc. It has a long history of being used as medicine as well. Medieval physicians used cinnamon in medicines to treat a variety of disorders, including arthritis, coughing, hoarseness, sore throats, etc. In addition to containing manganese, dietary fiber, iron, and calcium, cinnamon contains three major compounds—cinnamaldehyde, cinnamyl acetate and cinnamyl alcohol. After intake, these three active compounds are converted into cinnamic acid by oxidation and hydrolysis, respectively. Then, cinnamic acid is β-oxidized to benzoate in the liver. This benzoate exists as sodium salt (sodium benzoate) or benzoyl-CoA.

Glycerol tribenzoate or tribenzoin (IUPAC name: 2,3-dibenzoyloxypropyl benzoate), which is a member of the benzoic acid family. It is composed of a glycerol linked to three benzoic acid molecules via ester linkages. Glycerol tribenzoate is cleaved by different lipases in the body to produce three benzoate molecules. Typically, pancreatic lipase hydrolyzes the benzoic acid esterified to the first and third carbon atoms of glycerol, forming 2-monobenzoylglycerol and two molecules of benzoic acid. Then an isomerase transfers the ester bond from position 2 to 1. The bond in the first position is then hydrolyzed by pancreatic lipase to form free glycerol and another molecule of benzoic acid. Furthermore, benzoic acid exists mainly as its sodium salt. Sodium benzoate is quickly excreted from the body through urine and high doses are required to maintain an efficacious dose. Glycerol tribenzoate is an FDA-approved indirect food additive that is generally recognized as safe for use in food or food packaging.

Sodium benzoate is a widely-used food preservative due to its anti-microbial properties. It also has medical importance as a component of UCEPHAN®, a Food and Drug Administration (FDA)-approved drug (now discontinued) used in the treatment for hepatic metabolic defects associated with hyperammonemia, such as urea cycle disorder. The present inventor explored a novel use of sodium benzoate in treating the disease process of relapsing-remitting EAE in female SJL/J mice (see Brahmachari and Pahan, "Sodium benzoate, a food additive and a metabolite of cinnamon, modifies T cells at multiple steps and inhibits adoptive transfer of experimental allergic encephalomyelitis," J. Immunol., 2007, Jul 1; 179(1):275-83, the entire contents of which are expressly incorporated into the present application by reference).

Interestingly, proinflammatory cytokines have been found to have a role in neurodegenerative disorders such as Alzheimer's disease, Parkinson's disease, amyotrophic lateral sclerosis and Huntington's disease. For example, it has been shown that microglia are activated in response to a number of different pathological states within the CNS including injury, ischemia, and infection. Microglial activation results in the production of pro-inflammatory cytokines such as IL-1, IL-6, and TNF-alpha. Such chronic microglial activation may also contribute to the development and progression of neurodegenerative disorders. See Smith et al., "Role of pro-inflammatory cytokines released from microglia in neurodegenerative diseases," Brain Research Bull. 2012. 87: pp. 10-20.

Huntington's disease (HD) is a neurodegenerative disorder characterized by selective loss of neurons in the striatum and cortex, which leads to progressive motor dysfunction, cognitive decline, and psychiatric disorders. Although the cause of HD is well described—HD is a genetic disorder caused by a trinucleotide (CAG) repeat expansion in the gene encoding for huntingtin (HTT) on chromosome 4p16.3—the ultimate cause of neuronal death is still uncertain. Apart from impairment in systems for handling abnormal proteins, other metabolic pathways and mechanisms might contribute to neurodegeneration and progression of HD. Among these, inflammation seems to play a role in HD pathogenesis. Accordingly, there have been some attempts to slow HD progression targeting the immune system. See Rocha et al., "Neuroimmunology of Huntington's Disease: Revisiting Evidence from Human Studies," Mediators Inflammation 2016 (Article ID 8653132): pp. 1-10.

HD is also associated with increased inflammatory mediators in both the central nervous system and periphery. There is an increasing amount of evidence to suggest that peripheral tissue pathology as the result of inflammatory processes is an important factor in disease progression. Such peripheral tissue pathologies included skeletal muscle malfunction e.g. muscular dystrophies), cardiomyopathy and cardiac failure, gastrointestinal disorders, osteoporosis, diabetes, obesity and male reproductive dysfunction. See Mielcarek, "Huntington's disease is a multi-system disorder," Rare Dis. 2015; 3(Article ID e1058464): pp. 1-3; Akiho et al., "Cytokine-induced alterations of gastrointestinal motility in gastrointestinal disorders," World J Gastroint Pathophysiol 2011; 2: pp. 72-81; DePaepe et al., Cytokines and Chemokines as Regulators of Skeletal Muscle Inflammation: Presenting the Case of Duchenne Muscular Dystrophy," Mediators Inflammation, 2013 (Article ID 540370): pp. 1-10; Kumar et al., "Role of Cytokines in Heart Failure," J Pharmacol Rep 2017, 2: pp. 1-6; Stenz et al., Proinflammatory Cytokines, Markers of Cardiovascular Risks, Oxidative Stress, and Lipid Peroxidation in Patients with Hyperglycemic Crises," Diabetes, 2004, 53: pp. 2079-2086; Xiao et al., "Cytokines and Diabetes Research," J Diabetes Res, 2014 (Article ID 920613): pp. 1-2; Schmidt et al., "Inflammatory Cytokines in General and Central Obesity and Modulating Effects of Physical Activity," PLOS One, 2015, Article ID 0121971): pp. 1-17; McLean, "Proinflammatory Cytokines and Osteoporosis," Current Osteoporosis Rep. 2009, 7: pp. 134-139; Loveland et al., "Cytokines in Male Fertility and Reproductive Pathologies: Immunoregulation and Beyond," Front. Endocrinol. 8:307, doi: 10.3389/fendo.2017.00307.

In addition, the present inventor also discovered that sodium benzoate suppresses the disease process of multiple sclerosis (MS) in mice. The inventor has also discovered that sodium benzoate up-regulates a protein called DJ-1, which is a beneficial, neuroprotective protein having implications in neurodegenerative disorders, such as Parkinson's disease (PD) and Alzheimer's disease (AD) (see Khasnavis and Pahan, "Sodium Benzoate, a Metabolite of Cinnamon and a Food Additive, Upregulates Neuroprotective Parkinson Disease Protein DJ-1 in Astrocytes and Neurons," Journal of Neuroimmune Pharmacology, June 2012, Volume 7, Issue 2, pp 424-435, the entire contents of which are expressly incorporated into the present application by reference).

Further, it has been found that the level of neurotrophic factors, such as brain-derived neurotrophic factor (BDNF) and neurotrophin-3 (NT-3), decreases in the brain of patients with different neurodegenerative disorders, such as AD and PD. Recently, the present inventor delineated that sodium benzoate increases the production of BDNF and NT-3 in brain cells, indicating that it could be beneficial for neurodegenerative disorders (see Jana et al., "Up-regulation of neurotrophic factors by cinnamon and its metabolite sodium benzoate: therapeutic implications for neurodegenerative disorders," J. Neuroimmune Pharmacol., 2013 June; 8(3): 739-55, the entire contents of which are expressly incorporated into the present application by reference).

However, sodium benzoate is quickly metabolized and excreted from the body. Therefore, sodium benzoate is generally administered multiple times per day in order to ensure continual removal of toxic ammonia from the bloodstream.

What is needed is are compositions and methods for administering sodium benzoate and related drugs that are easily administer and convenient for the patent. Although sodium benzoate exhibits beneficial effects in connection with Multiple Sclerosis, Parkinson's Disease, Alzheimer's Disease, and other neurodegenerative disorders, the fact that the sodium benzoate is quickly metabolized and excreted from the body poses certain problems that can only be addressed by repeatedly administering this compound to patients throughout the day. Therefore, long-term exposure form of sodium benzoate that allows for a reduced administration regime and improved patient compliance would be beneficial.

SUMMARY OF THE INVENTION

The inventor has discovered compositions and methods for treating various disorders and diseases. In some embodiments, the present disclosure provides a method for inhibiting progression of Huntington's disease. The method comprises administering to a patient in need thereof an effective amount of a pharmaceutical composition comprising glyceryl tribenzoate and/or glyceryl dibenzoate, wherein the administering comprises delivering an inhalation dosage form of the pharmaceutical composition, and wherein the pharmaceutical composition is inhaled by the patient.

In other embodiments, the method may further comprise nebulizing the pharmaceutical composition to create the inhalation dosage form. In certain embodiments, the pharmaceutical composition may be nebulized by an inhaler. In other embodiments, the administering may further comprise delivering an oral dosage form of the pharmaceutical composition to the patient. In any of the disclosed embodiments, the method may further comprise applying a transdermal patch to the patient to administer the pharmaceutical composition.

In any of the disclosed embodiments, the pharmaceutical composition may be administered to the patient in any including one time per day, two times per day, and three times per day.

The present disclosure also provides a method for inhibiting progression of a neurodegenerative disorder. The method comprises administering to a patient in need thereof an effective amount of a pharmaceutical composition comprising glyceryl tribenzoate and/or glyceryl dibenzoate.

In any of the disclosed embodiments, the neurodegenerative disorder may be Huntington's disease.

The present disclosure further provides a method for improving a locomotor activity of a patient. The method comprises administering to the patient an effective amount of a pharmaceutical composition comprising glyceryl tribenzoate and/or glyceryl dibenzoate.

In some embodiments, the locomotor activity may include one or more of walking, running, jumping, and any combination thereof.

The present disclosure also provides a method comprising administering to a patient an effective amount of a pharmaceutical composition comprising glyceryl tribenzoate and/or glyceryl dibenzoate, and reducing activation of a cell in a brain of the patient, wherein the cell is selected from the group consisting of an astroglial cell, a microglial cell, and any combination thereof.

In certain some embodiments, a cortex and/or a striatum comprises the cell.

The present disclosure further provides a method comprising administering to a patient an effective amount of a pharmaceutical composition comprising glyceryl tribenzoate and/or glyceryl dibenzoate and treating a tissue and/or organ outside of the central nervous system.

In some embodiments, the organ is a heart and the method prevents or delays heart failure.

In other embodiments, the method prevents or delays a member selected from the group consisting of unintended weight loss, glucose intolerance, osteoporosis, gastrointestinal abnormalities, muscular atrophy, testicular atrophy, and any combination thereof.

The present disclosure also provides a method for inhibiting progression of Huntington's disease. The method comprises administering to a patient in need thereof an effective amount of a pharmaceutical composition comprising glyceryl tribenzoate and/or glyceryl dibenzoate, wherein the administering comprises buccal administration.

The present disclosure further provides a composition for buccal administration (e.g., a buccal composition). The buccal composition comprises glyceryl tribenzoate and/or glyceryl dibenzoate. Further, the composition may comprise any other component disclosed herein. For example, the composition may comprise a glyceryl tribenzoate and/or glyceryl dibenzoate stabilizer (a "GTB/GDB stabilizer").

In any of the disclosed embodiments, the inhalation dosage form comprises glyceryl tribenzoate and/or glyceryl dibenzoate and may further comprise any other component disclosed herein. For example, the composition may comprise a GTB/GDB stabilizer.

The present disclosure further provides an oral glyceryl tribenzoate and/or glyceryl dibenzoate dosage form, which comprises glyceryl tribenzoate and/or glyceryl dibenzoate in buccal, tablet, capsule, solution, or thin film form. Further, the composition may comprise any other component disclosed herein. For example, the composition may comprise a GTB/GDB stabilizer.

In some embodiments, a composition, pharmaceutical formulation, or dosage form herein may further comprise a GTB/GDB stabilizer. A GTB/GDB stabilizer may be, but is not limited to, one or more agent selected from the group consisting of phosphatidyl choline, phosphatidyl inositol, phosphatidyl ethanolamine, or other phospholipids. It may also contain a mixture of different phospholipids. For buccal delivery, addition of a stabilizer is important as lipase present in saliva may breakdown glyceryl tribenzoate in the mouth. The presence of one or more CTB/GDB stabilizer may be, but is not limited to, an element of a composition, pharmaceutical formulation, or dosage form adapted for buccal, nasal, or transdermal administration, or a method utilizing the same. Moreover, for intranasal administration or nebulization, it could be mixed with saline.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

DETAILED DESCRIPTION OF THE INVENTION

Figure 1:
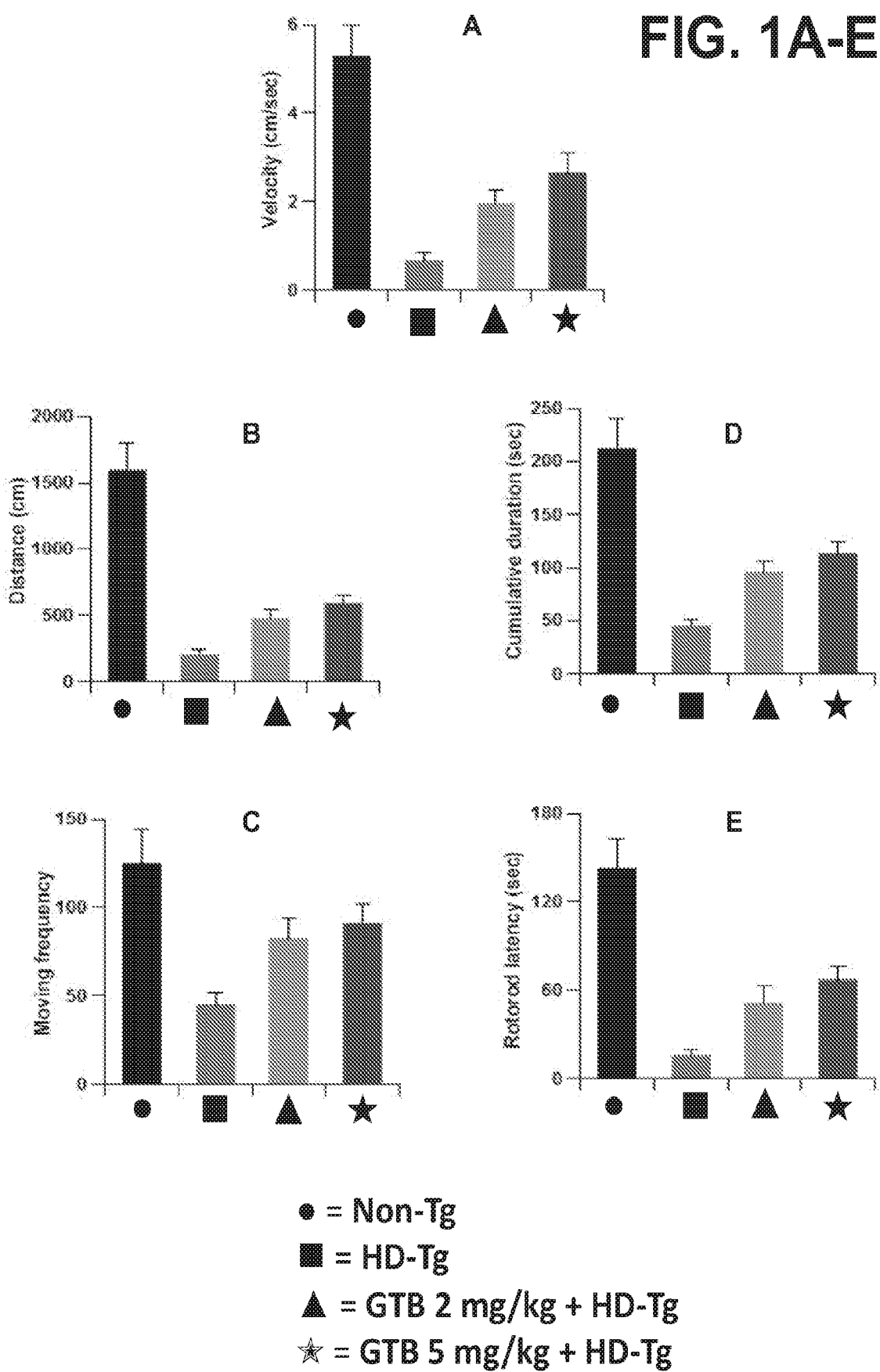
FIGS. 1A-1E depict results of experiments conducted showing that nebulization of glycerol tribenzoate improves locomotor activities in Huntington transgenic (N171-82Q) mice.

Throughout this disclosure, various quantities, such as amounts, sizes, dimensions, proportions and the like, are presented in a range format. It should be understood that the description of a quantity in range format is merely for convenience and brevity and should not be construed as an inflexible limitation on the scope of any embodiment. Accordingly, the description of a range should be considered to have specifically disclosed all the possible subranges as well as all individual numerical values within that range unless the context clearly dictates otherwise. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual values within that range, for example, 1.1, 2, 2.3, 4.62, 5, and 5.9. This applies regardless of the breadth of the range. The upper and lower limits of these intervening ranges may independently be included in the smaller ranges, and are also encompassed within the disclosure, subject to any specifically excluded limit in the stated range. Where the stated range includes one or both of the limits, ranges excluding either or both of those included limits are also included in the disclosure, unless the context clearly dictates otherwise.

The terminology used herein is for the purpose of describing particular embodiments only and is not intended to be limiting of any embodiment. As used herein, the singular forms "a," "an" and "the" are intended to include the plural forms as well, unless the context clearly indicates otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Unless specifically stated or obvious from context, as used herein, the term "about" in reference to a number or range of numbers is understood to mean the stated number and numbers +/−10% thereof, or 10% below the lower listed limit and 10% above the higher listed limit for the values listed for a range.

The present disclosure provides novel treatments for neurodegenerative disorders including, but not limited to, Huntington's disease. Alzheimer's disease, and Parkinson's disease and other movement disorders, that require only a single daily administration of a pharmaceutical composition. Moreover, the inventor discovered that by using a nebulization technique for composition delivery, the amount of the composition administered to the patient can be significantly decreased. In certain embodiments, the pharmaceutical composition disclosed herein comprises glyceryl tribenzoate (also known as tribenzoin). In certain embodiments, the pharmaceutical composition disclosed herein comprises glyceryl dibenzoate. In some embodiments, the pharmaceutical composition comprises glyceryl tribenzoate and glyceryl dibenzoate.

Glyceryl di- and tribenzoate will slowly form sodium benzoate in the body since these molecules will be cleaved in the intestine by various lipases. Therefore, it is hypothesized that glyceryl di- and tribenzoate will exhibit highly improved therapeutic efficacies as compared to sodium benzoate.

In some embodiments, a treatment is disclosed for inhibiting the progression of neurodegenerative disorders. A non-limiting example of a neurodegenerative disorder is Huntington's disease. The treatment comprises administering an effective amount of a pharmaceutical composition comprising glyceryl tribenzoate and/or glyceryl dibenzoate to a patient in need thereof. In some aspects, the neurodegenerative disorders may be identified by a decrease in levels of BDNF or NT-3 relative to normal subjects. In accordance with the present disclosure, the treatment may be administered one time per day. In some aspects the treatment may be administered two times per day, three times per day, or more than three times per day.

In the treatment methods contemplated by the present disclosure, the glyceryl tribenzoate and/or glyceryl dibenzoate may be used alone or in compositions together with a pharmaceutically acceptable carrier or excipient. For example, an oral dosage form composition may comprise glyceryl tribenzoate and/or glyceryl dibenzoate in addition to a pharmaceutical acceptable carrier. An inhalation dosage form composition may comprise glyceryl tribenzoate and/or glyceryl dibenzoate in addition to a pharmaceutical acceptable carrier. A composition for buccal administration may comprise glyceryl tribenzoate and/or glyceryl dibenzoate in addition to a pharmaceutical acceptable carrier. Further, if a transdermal patch is used as part of the method of administering the glyceryl tribenzoate and/or glyceryl dibenzoate to the patient, the transdermal patch may comprise the glyceryl tribenzoate and/or glyceryl dibenzoate in addition to a pharmaceutical acceptable carrier.

As used herein, the term "pharmaceutically acceptable carrier" means a non-toxic, inert solid, semi-solid or liquid filler, diluent, encapsulating material or formulation auxiliary of any type.

Some examples of materials which can serve as pharmaceutically acceptable carriers are sugars such as lactose, glucose and sucrose; starches such as corn starch and potato starch; cellulose and its derivatives such as sodium carboxymethyl cellulose, ethyl cellulose and cellulose acetate; powdered tragacanth; malt; gelatin; talc; excipients such as cocoa butter and suppository waxes; oils such as peanut oil, cottonseed oil; safflower oil; sesame oil; olive oil; corn oil and soybean oil; glycols such as propylene glycol; esters such as ethyl oleate and ethyl laurate; agar; buffering agents such as magnesium hydroxide and aluminum hydroxide; alginic acid; pyrogen-free water; isotonic saline; Ringer's solution; ethyl alcohol, and phosphate buffer solutions, as well as other non-toxic compatible lubricants such as sodium lauryl sulfate and magnesium stearate, as well as coloring agents, releasing agents, coating agents, sweetening, flavoring and perfuming agents, preservatives and antioxidants can also be present in the composition, according to the judgment of the formulator. Other suitable pharmaceutically acceptable excipients are described in "Remington's Pharmaceutical Sciences," Mack Pub. Co., New Jersey, 1991, the contents of which are expressly incorporated herein by reference.

A composition, formulation, or dosage form herein may further comprise one or more GTB/GDB stabilizer. As used herein, a GTB/GDB stabilizer is a substance that extends the time before which the glyceryl tribenzoate or glyceryl dibenzoate is converted to a benzoate salt in the environment in which the formulation or dosage form is administered, in comparison to the conversion in its absence. Non-limiting examples of GTB/GDB stabilizers include phosphatidyl choline, phosphatidyl inositol, phosphatidyl ethanolamine, or other phospholipids. A composition, formulation, or dosage form further comprising one or more GTB/GDB stabilizer may be administered in any one of the methods herein. A GTB/GDB stabilizer may be present in an amount of about 50 mg to about 1000 mg in a composition, formulation, or dosage form herein. In some embodiments, the GTB/GDB stabilizer may be present in an amount ranging from about 50 mg to about 500 mg or about 50 mg to about 100 mg.

In addition to glyceryl tribenzoate, glyceryl dibenzoate, and/or a pharmaceutically acceptable carrier, an oral dosage form composition may comprise one or more GTB/GDB stabilizer. A GTB/GDB stabilizer in an oral dosage from may be present in an amount of about 50 mg to about 1000 mg. In some embodiments, the GTB/GDB stabilizer may be present in an amount ranging from about 50 mg to about 500 mg or about 50 mg to about 100 mg.

In addition to glyceryl tribenzoate, glyceryl dibenzoate, and/or a pharmaceutically acceptable carrier, an inhalation dosage form composition may comprise one or more GTB/GDB stabilizer. A GTB/GDB stabilizer in an inhalation dosage from may be present in an amount of about 50 mg to about 1000 mg. In some embodiments, the GTB/GDB stabilizer may be present in an amount ranging from about 50 mg to about 500 mg or about 50 mg to about 100 mg.

In addition to glyceryl tribenzoate, glyceryl dibenzoate, and/or a pharmaceutically acceptable carrier, a composition for buccal administration may comprise one or more GTB/GDB stabilizer. A GTB/GDB stabilizer in a composition for buccal administration may be present in an amount of about 50 mg to about 1000 mg. In some embodiments, the GTB/GDB stabilizer may be present in an amount ranging from about 50 mg to about 500 mg or about 50 mg to about 100 mg.

In addition to glyceryl tribenzoate, glyceryl dibenzoate, and/or a pharmaceutically acceptable carrier, a transdermal patch may comprise one or more GTB/GDB stabilizer. A GTB/GDB stabilizer in a composition for transdermal administration may be present in an amount of about 50 mg to about 1000 mg. In some embodiments, the GTB/GDB stabilizer may be present in an amount ranging from about 50 mg to about 500 mg or about 50 mg to about 100 mg.

As is commonly understood in the art, a transdermal patch is an adhesive patch that is placed on the skin of a patient. The patch comprises a composition/medication and delivers the composition/medication to the patient through the skin.

In some embodiments, the pharmaceutical composition may be administered to a patient using a nebulization technique. A nebulizer may be used to change a liquid solution of a pharmaceutical composition into a fine mist that may be inhaled by a patient. The inventor determined numerous benefits of this technique as opposed to other delivery techniques, such as injections or administering pills.

For example, the dosage of the pharmaceutical composition can be significantly decreased when nebulization is used as the delivery method. In some instances, the dosage may be reduced by about one tenth or one twentieth as compared to, for example, injections, oral administration/ingestion of a liquid solution or oral administration/ingestion of a pill. Moreover, using a nebulization technique bypasses the digestive system whereas ingesting a pill or liquid solution of a pharmaceutical composition sends the composition to the digestive system. Finally, using a nebulization technique allows the pharmaceutical composition to travel from the olfactory bulb directly to the brain.

In some embodiments, the nebulized pharmaceutical composition may be inhaled through one or both of the mouth or the nasal passage. Without being bound to any theory, it is believed that nasal administration of the composition can take advantage of "nose-to-brain" (N2B) transport systems in which several possibilities exist for bypassing the blood-brain-barrier for direct delivery to the brain. These include the draining of drugs absorbed in the nasal mucosa into the sinus and eventually to the carotid artery, where a "counter-current transfer" from venous blood to the brain may occur. Lymphatic drainage into the perivascular space from the olfactory trigeminal nerves between the central nervous system (CNS) have also been postulated as the mechanism of N2B transport.

Nebulizers are known in the art and the invention of the present disclosure can be used in connection with any nebulizer. For example, the pharmaceutical composition disclosed herein may be nebulized with an inhaler or a Buxco® Inhalation Tower All-In-One Controller.

In certain embodiments, the glyceryl tribenzoate and/or glyceryl dibenzoate may be orally administered to be ingested by humans and other animals.

The glyceryl tribenzoate and/or glyceryl dibenzoate may be formulated for administration. Methods of formulation are well known in the art (see, for example, Remington: *The Science and Practice of Pharmacy,* Mack Publishing Company, Easton, Pa., 19th Edition (1995)). Pharmaceutical compositions for use in accordance with the present disclosure can be in the form of sterile, non-pyrogenic liquid solutions or suspensions, coated capsules, lyophilized powders, or other forms known in the art.

Solid dosage forms for oral administration include, as illustrative but non-limiting examples, capsules, tablets, pills, powders, thin films and granules. In solid dosage forms, the active compound may be mixed with at least one inert, pharmaceutically acceptable excipient or carrier. Illustrative, non-limiting examples of excipients or carriers include sodium citrate or dicalcium phosphate and/or a) one or more fillers or extenders (a filler or extender may be, but is not limited to, one or more selected from starches, lactose, sucrose, glucose, mannitol, and silicic acid), b) one or more binders (binders may be selected from, but not limited to, carboxymethylcellulose, alginates, gelatin, polyvinylpyrrolidinone, sucrose, and acacia), c) one or more humectants (a humectant may be, but is not limited to, glycerol), d) one or more disintegrating agents (disintegrating agents may be selected from, but are not limited to, agar-agar, calcium carbonate, potato or tapioca starch, alginic acid, silicates, and sodium carbonate), e) one or more solution retarding agents (for example, but not limited to, paraffin), f) one or more absorption accelerators (selected from, but not limited to, quaternary ammonium compounds), g) one or more wetting agents (for example, but not limited to, acetyl alcohol and glycerol monostearate), h) one or more absorbents (selected from, but not limited to, kaolin and bentonite clay), and i) one or more lubricants (selected from, but not limited to, talc, calcium stearate, magnesium stearate, solid polyethylene glycols, and sodium lauryl sulfate). In the case of capsules, tablets and pills, for example, the dosage form may also comprise buffering agents.

Solid compositions of a similar type may also be employed as fillers in soft and hard-filled gelatin capsules using such excipients as lactose or milk sugar as well as high molecular weight polyethylene glycols and the like.

The solid dosage forms of tablets, dragees, capsules, pills, and granules can be prepared with coatings and shells. Illustrative, non-limiting examples of coatings and shells include enteric coatings and other coatings/shells well known in the pharmaceutical formulating art. They may optionally contain opacifying agents and can also be of a composition that they release the active ingredient(s) only, or preferentially, in a certain part of the intestinal tract, optionally, in a delayed manner. Examples of embedding compositions that may be used include, but are not limited to, polymeric substances and waxes.

The active compounds can also be in micro-encapsulated form with one or more excipients as noted above. The solid dosage forms of tablets, dragees, capsules, pills, and granules can be prepared with coatings and shells. The coatings or shells may be, but are not limited to, enteric coatings, release-controlling coatings and other coatings in the pharmaceutical formulating art. In solid dosage forms, the active compound may be admixed with at least one inert diluent. The inert diluent may include, but is not limited to, one or more of, sucrose, lactose or starch. Dosage forms may also comprise additional substances other than inert diluents. The additional substances may be, but are not limited to, tableting lubricants and other tableting aids. The tableting lubricants and other aids may be, but are not limited to, magnesium stearate and microcrystalline cellulose. In the case of capsules, tablets and pills, for example, the dosage forms may also comprise buffering agents. They may comprise opacifying agents. They may be of a composition that releases the active ingredient(s) only, or preferentially, in a certain part of the intestinal tract. The release may be in a delayed manner. Examples of embedding compositions that can be used include, but are not limited to, polymeric substances and waxes.

Liquid dosage forms for oral administration include, but are not limited to, pharmaceutically acceptable emulsions, microemulsions, solutions, suspensions, syrups and elixirs. In addition to the active compounds, the liquid dosage forms may comprise one or more inert diluents. The inert diluents may be selected from those commonly used in the art. Illustrative, non-limiting examples of inert diluents include water or other solvents, solubilizing agents and emulsifiers (including, but not limited to, ethyl alcohol, isopropyl alcohol, ethyl carbonate, EtOAc, benzyl alcohol, benzyl benzoate, propylene glycol, 1,3-butylene glycol, dimethylformamide, oils (in particular, cottonseed, groundnut, corn, germ, olive, castor, and sesame oils), glycerol, tetrahydrofurfuryl alcohol, polyethylene glycols and fatty acid esters of sorbitan, and mixtures thereof). The oral compositions may comprise one or more adjuvants. Illustrative, non-limiting examples of adjuvants include wetting agents, emulsifying and suspending agents, sweetening, flavoring, and perfuming agents.

Effective amounts of the compositions of this disclosure include any amount sufficient to inhibit (e.g., slow or stop) the progression of a neurodegenerative disorder. In some embodiments, effective amounts of the compositions include any amount sufficient to inhibit (e.g., slow or stop) the deterioration of a locomotor activity of a patient. in some embodiments, effective amounts of the compositions include any amount sufficient to improve a locomotor activity of a patient.

In some embodiments, effective amounts of the compositions include any amount sufficient to reduce activation of a cell in a brain of the patient, wherein the cell is selected from the group consisting of an astroglial cell, a microglial cell, and any combination thereof. In some embodiments, effective amounts of the compositions include any amount sufficient to treat a tissue and/or organ outside of the central nervous system.

The amount of active ingredient (glyceryl tribenzoate and/or glyceryl dibenzoate) that may be combined with the optional carrier materials to produce a single dosage form may vary depending upon the host treated and the particular mode of administration. The specific dose level for any particular patient may depend upon a variety of factors including the activity of the specific compound employed, the age, body weight, general health, sex, diet, time of administration, route of administration, rate of excretion, drug combination, and the severity of the particular disorder or disease undergoing therapy. A therapeutically effective amount for a given situation can be readily determined by routine experimentation and is within the skill and judgment of the ordinary clinician.

In accordance with certain methods of treatment disclosed in the present application, progression of various disorders is slowed or stopped in a patient (a patient may be a human, a lower mammal, or a warm blooded animal), by administering to the patient an effective amount of the glyceryl tribenzoate and/or glyceryl dibenzoate in such amounts, and for such time as is necessary, to achieve the desired result. An amount of a compound that is effective to slow or stop the progression of a disease or disorder may refer to a sufficient amount of the compound to treat the disease or disorder at a reasonable benefit/risk ratio applicable to any medical treatment.

The total daily usage of the compounds and compositions of the present disclosure may be decided by the attending physician within the scope of sound medical judgment. The specific therapeutically effective dose level for any particular patient may depend upon a variety of factors including the disease or disorder being treated and the severity of the disorder; the activity of the specific compound employed; the specific composition employed; the age, body weight, general health, sex and diet of the patient; the time of administration, route of administration, and rate of excretion of the specific compound employed; the duration of the treatment; and drugs used in combination or coincidental with the specific compound employed.

The "effective amount" or dose of a compound of the present disclosure, such as glyceryl tribenzoate and/or glyceryl dibenzoate, to be administered to warm-blooded animals (e.g., humans) may vary depending upon the disorder to be treated. In connection with certain neurodegenerative disorders, such as, but not limited to, Huntington's disease or other disorders, such as Parkinson's disease and Alzheimer's disease, and any peripheral disease to be treated, the effective amount may be from approximately 1 g to approximately 20 g per 50 kg person, per day, or any amount or sub-range thereof. For example, the effective amount may be about 17 g, about 18 g, or about 19 g. In some aspects, the dose may be from approximately 1 g to approximately 16 g, per 50 kg person, per day. In one particular aspect, the dose may be about 5 g per 50 kg person, per day. In other aspects, the effective amount may be from about 25 mg/kg to about 50 mg/kg, per person, per day. The sub-range may have a low endpoint selected from 5 g/50 kg person/day and 1 g/50 kg person/day increments up to 49 g/50 kg person/day. The sub-range may have a high endpoint selected from 51 g/50 kg person/day and 1 g/50 kg person/day increments up to 50 g/50 kg person/day. The low endpoint is selected to be lower than the high endpoint.

However, if certain administration techniques, such as nebulization, are used as the method of administering the pharmaceutical composition, the inventor determined that the aforementioned effective amounts can be significantly decreased. For example, in some embodiments, the amount administered to the patient may be from about 2 mg/kg body weight per day to about 10 mg/kg body weight per day, such as from about 2 mg/kg body weight per day to about 8 mg/kg body weight per day or from about 2 mg/kg body weight per day to about 5 mg/kg body weight per day. In some embodiments, the amount administered to a patient is about 2 mg/kg body weight per day, about 3 mg/kg body weight per day, about 4 mg/kg body weight per day, or about 5 mg/kg body weight per day. The amount administered may be a value in the range of from about 2 mg/kg/day to about 10 mg/kg/day. The value may be in a sub-range chosen from doses in the range of 2 mg/kg/day to about 10 mg/kg/day. The low endpoint of a sub-range may be selected from 2 mg/kg/day and every 0.1 mg/kg/day increment above 2 mg/kg/day up to 9.9 mg/kg/day. The high endpoint of a sub-range may be selected from 2.1 mg/kg/day and every 0.1 mg/kg/day increment above 2.1 mg/kg/day up to 10 mg/kg/day. The selection of the low endpoint and high endpoint of a sub-range is made such that the low endpoint is lower than the high endpoint. The administration may be once per day, twice per day, or more than two times per day.

In an embodiment, the dose of glyceryl tribenzoate and/or glyceryl dibenzoate delivered by oral administration is about 25 to about 400 mg/kg/day, Formulations and methods including this dose are contemplated. The dose may be any value from about 25 to about 400 mg/kg/day, or in a subrange selected from any two integer values from about 25 to about 400 mg/kg/day.

In an embodiment, the dose of glyceryl tribenzoate and/or glyceryl dibenzoate administered by transdermal patch is about 25 to about 200 mg/kg/day. Formulations, transdermal patches including said formulations, and methods including this dose are contemplated. The dose may be any value from about 2.5 to about 200 mg/kg/day, or in a subrange selected from any two integer values from about 25 to about 200 mg/kg/day.

In an embodiment, the dose of glyceryl tribenzoate and/or glyceryl dibenzoate administered by nebulization is about 2 to about 5 mg/kg/day. Formulations and methods including this dose are contemplated. The dose may be any value from about 2 to about 5 mg/kg/day, or in a subrange selected from any two 0.1 mg/kg/day increments from about 2 to about 5 mg/kg/day.

In an embodiment, the dose of tribenzoate and/or glyceryl dibenzoate administered by buccal administration is about 0.5 to about 5 mg/day. Formulation and methods including this dose are contemplated. The dose may be any value from about 0.5 to about 5 mg/kg/day, or in a subrange selected from any two 0.1 mg/kg/day increments from about 0.5 to about 5 mg/kg/day.

Additionally, in some embodiments, a patient may receive the glyceryl tribenzoate and/or glyceryl dibenzoate by multiple administration methods. In some embodiments, the glyceryl tribenzoate and/or glyceryl dibenzoate may be administered to the patient by injection, nebulization, buccal administration, oral administration (e.g., solution, capsule, tablet, thin film, etc.), transdermal patch, and any combination of the foregoing. For example, the glyceryl tribenzoate and/or glyceryl dibenzoate may be administered to the patient using a nebulization technique in addition to an oral administration. In some embodiments, oral administration may be used to maintain an optimal drug concentration in the patient during nasal treatment. In some embodiments, the glyceryl tribenzoate and/or glyceryl dibenzoate may be administered to the patient using a nebulization technique in addition to injection(s). In some embodiments, the glyceryl tribenzoate and/or glyceryl dibenzoate may be administered to the patient using a nebulization technique in addition to a transdermal patch. The present disclosure encompasses any combination of the administration techniques described or contemplated herein.

The present inventor discovered that the pharmaceutical compositions disclosed herein, along with the administration methods, can be used to improve locomotor activities (see Examples disclosed herein). As such, the present disclosure is also directed to compositions and methods useful for improving locomotor activities. In some embodiments, the locomotor activities are selected from the group consisting of walking, running, jumping, and any combination thereof.

Any or all of these locomotor activities may be improved by administering a pharmaceutical composition to a patient, wherein the composition comprises glyceryl dibenzoate and/or glyceryl tribenzoate. In some embodiments, the composition is administered using a nebulization technique whereby the patient inhales the pharmaceutical composition. Depending upon the administration method and the number of administrations per day (optionally among other factors), an effective amount can be selected by one of ordinary skill in the art with the guidance provided in the present application.

Additionally, the present inventor discovered that the pharmaceutical compositions disclosed herein, along with the administration methods, can be used to reduce activation of certain cells in the brain. For example, using the pharmaceutical compositions disclosed in the present application in combination with one or more of the administration methods disclosed herein, the inventor discovered that it is possible to reduce activation of astroglial cells and microglial cells in the brain (see Examples disclosed herein). In some embodiments, the cells are contained in the cortex and/or striatum.

Still further, the inventor discovered that the presently disclosed pharmaceutical compositions and methods of administration can be used to treat tissues and/or organs outside of the central nervous system (CNS). For example, Huntington's disease is not only a neurodegenerative disease but is also a systemic disorder, which affects several peripheral organs. The neurodegenerative effects of the disease are most severe because the Huntingtin protein responsible for the disease is highly expressed in the brain cells. The nasal/inhalation mode of drug administration allows glyceryl tribenzoate and/or glyceryl dibenzoate to bypass the blood brain barrier and is therefore well suited to treat the neurodegenerative effects of Huntington's disease. However, the inventor determined that using a different method of administration, such as, but not limited to, buccal, injection, transdermal patch, and/or oral (e.g., solution, capsule, tablet, thin film, etc.), tissues and/or organs outside of the CNS can be treated.

The following examples are intended to illustrate some embodiments of the present disclosure and are not intended to limit the disclosure or scope of the claims in any manner.

EXAMPLES

Example 1

Efficacy of Glyceryl Tribenzoate Nebulization in Improving Certain Locomotor Activities in Huntington Transgenic (N171-82Q) Mice Since many features of Huntington's disease are modeled in N171-82Q transgenic mice, the effects of glyceryl tribenzoate nebulization on locomotor activities were examined in N171-82Q mice. A Buxco® Inhalation Tower All-In-One Controller was used to nebulize the glyceryl tribenzoate. A whole-body chamber was fitted with aeroneb ultrasonic nebulizers supplied with air from a Buxco® bias flow pump. Huntington transgenic (N171-82Q) mice were allowed to nebulize glyceryl tribenzoate at doses of about 2 and about 5 mg/kg body wt/day (solubilized in a volume of 100 µl saline/mouse) for 3 min. Briefly, three-month old transgenic mice were treated with different doses (about 2 and about 5 mg/kg body wt/d) of glyceryl tribenzoate solubilized in about 100 µl saline via nebulization. Control Huntington's disease mice received only 100 µl saline as vehicle. After six weeks of treatment, locomotor activities were monitored. Data are mean+SEM of three mice per group.

As can be seen in FIGS. 1A-1E, nebulization of glycerol tribenzoate improves locomotor activities in Huntington transgenic (N171-82Q) mice. Impairment in locomotor activities was observed in Huntington's disease transgenic mice as compared to age-matched non-Tg mice. However, nebulization of glyceryl tribenzoate (GTB) at both of the doses markedly improved velocity (FIG. 1A), total distance (FIG. 1B), moving frequency (FIG. 1C), cumulative duration (FIG. 1D), and rotorod performance (FIG. 1E) of Huntington's disease transgenic mice. Velocity refers to the speed at which the mouse walks. Total distance refers to the distance covered by the mouse in a certain period of time. Moving frequency refers to how much a mouse moves around in a given time period and cumulative duration refers to total duration spent at the center.

Example 2

Efficacy of Glyceryl Tribenzoate (GTB) in Reducing Huntington Inclusion Bodies in the Striatum and Cortex of Huntington Transgenic (N171-82Q) Mice Deposition of huntingtin (HTT) inclusion bodies is a pathological hallmark of Huntington's disease. This pathology is based on an expansion of CAG repeats in exon 1 of the huntingtin gene on chromosome 4 that generates a mutant huntingtin protein leading to abnormal HTT aggregates. Since GTB treatment reduced glial activation, the effect of GTB on HTT inclusion bodies was monitored in striatum and cortex by immunostaining.

Briefly, three-month old transgenic mice were treated with GTB (about 50 mg/kg body wt/day) via gavage. Control Huntington's disease mice received only 100 µl 0.5% methylcellulose as vehicle. After two months of treatment, huntingtin inclusion bodies (HTT) were monitored in brain sections (striatal—FIG. 2A, cortical—FIG. 2B) by immunohistochemistry. Further, HTT positive ("(+)ve") cells were counted in two sections (striatal—FIG. 2C, cortical—FIG. 2D) of each of six mice per group.

Figure 2:
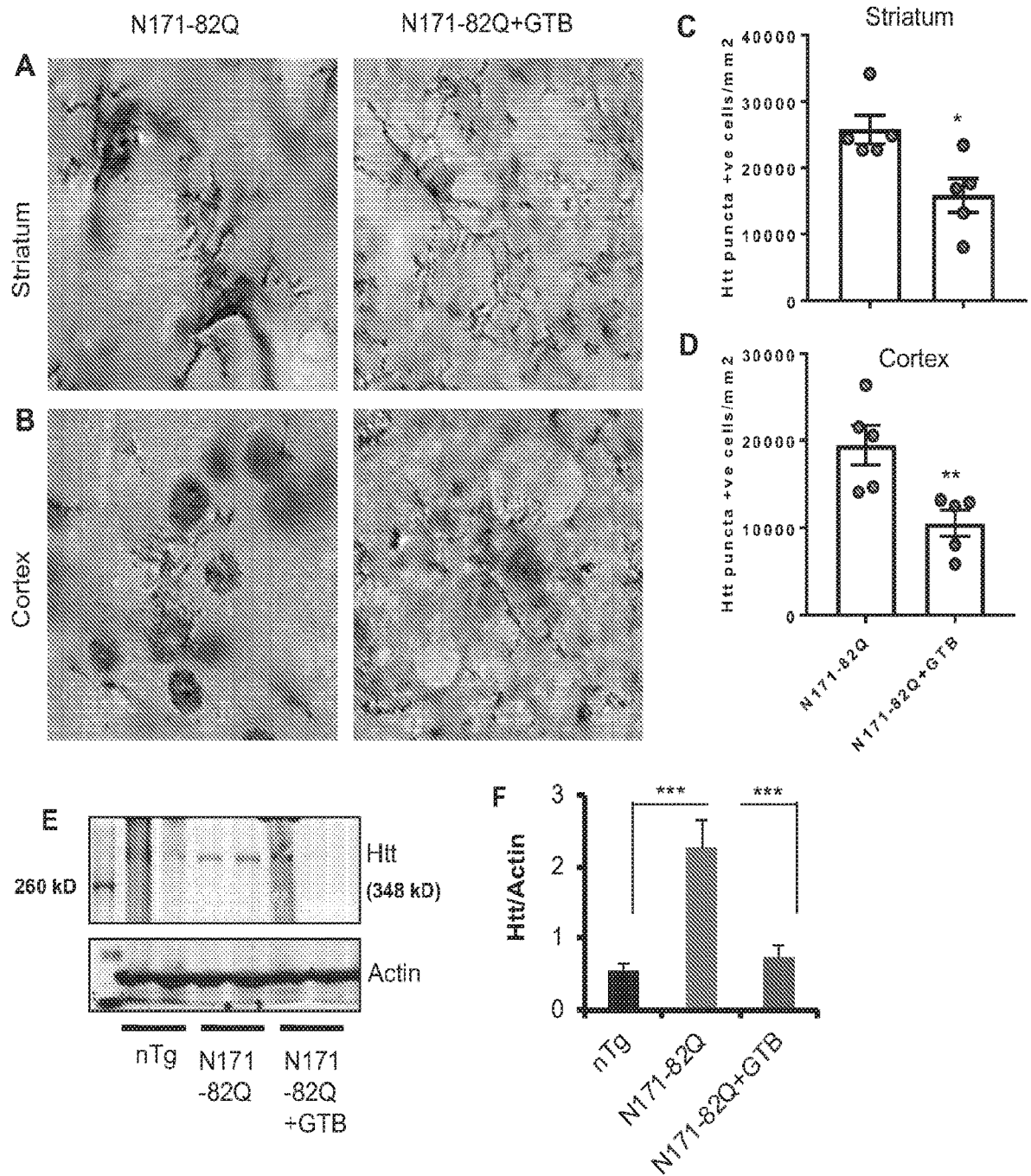
FIGS. 2A and 2B show the results from an immunohistochemistry study.
FIGS. 2C and 2D show the number of Huntingtin inclusion (+ve) cells in the striatum and cortex of GTB treated and untreated mice.
FIGS. 2E and 2F show the results of a Western blotting analysis.

FIG. 2A and 2B show the results from immunohistochemistry, which indicate that administration of GTB reduces the number of HTT inclusion bodies in striatum and cortex. FIGS. 2C and 2D show the number of HTT (+ve) cells in striatum and cortex of GTB treated and untreated mice and indicate a reduction in the number of HTT in treated mice.

Oral GTB treatment led to significant reduction in HTT inclusion in the striatum and cortex of N171-82Q Tg mice (FIG. 2A-2D). This was also confirmed by Western blotting. By Western blotting, the inventor could detect 348 kDa band of aggregated HTT in the cortex that was inhibited by oral GTB treatment (FIG. 2E-2F).

As can be seen in FIG. 2A-2F, oral administration of glyceryl tribenzoate reduces Huntington inclusion bodies in the striatum and cortex of Huntington transgenic mice.

Example 3

Figure 3:
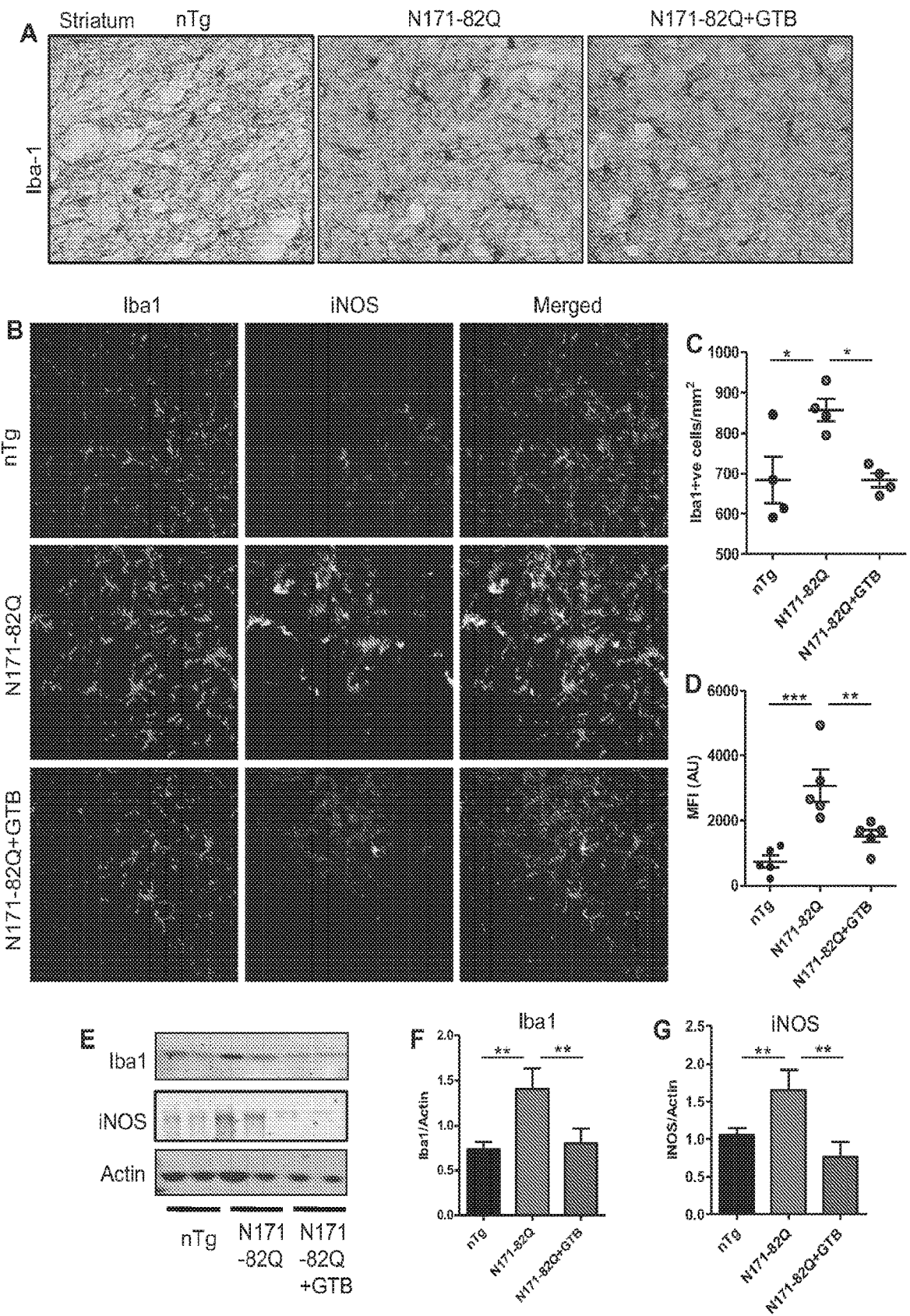
FIG. 3A shows the result of an immunohistochemistry study.
FIG. 3B shows the results from double-label immunofluorescence study, FIG. 3C counts the number of Iba-1 +ve cells in control mice (nTg), untreated N171-82Q mice, and GTB treated N171-82Q mice.
FIG. 3D depicts the Mean Fluorescence Intensity (MFI) of iNOS in control mice (nTg), untreated N171-82Q mice, and GTB treated N171-82Q mice.
FIG. 3E is the Western blot for Iba-1 and iNOS.
FIGS. 3F and 3G are a quantitative analysis of the Western blot shown in FIG. 3E.

Efficacy of Glyceryl Tribenzoate (GTB) in Reducing Microglial Activation in the Striatum of Huntington Transgenic (N171-82Q) Mice Three-month old transgenic mice were treated with GTB (about 50 mg/kg body wt/day) via gavage. Control Huntington's disease mice received only 100 µl 0.5% methylcellulose as vehicle. After two months of treatment, microglial activation was monitored in striatal sections by DAB staining (FIG. 3A) and double-label immunofluorescence (FIG. 3B). The results shown in FIGS. 3A-3G represent an analysis of six mice per group.

FIG. 3A shows the result of immunohistochemistry staining using Iba-1 antibody in the cortex of control mice (nTg), untreated N171-82Q mice and GTB treated N171-82Q mice. FIG. 3B shows the results from double-label immunofluorescence and FIG. 3C counts the number of Iba-1 positive ("+ve") cells in control mice (nTg), untreated N171-82Q mice and GTB treated N171-82Q mice. FIG. 3D depicts the Mean Fluorescence Intensity (MFI) of iNOS in control mice (nTg), untreated N171-82Q mice and GTB treated N171-82Q mice. FIG. 3E is the western blot for Iba-1 and iNOS and FIGS. 3F and 3G are a quantitative analysis of the western blot shown in FIG. 3E.

Example 4

Figure 4:
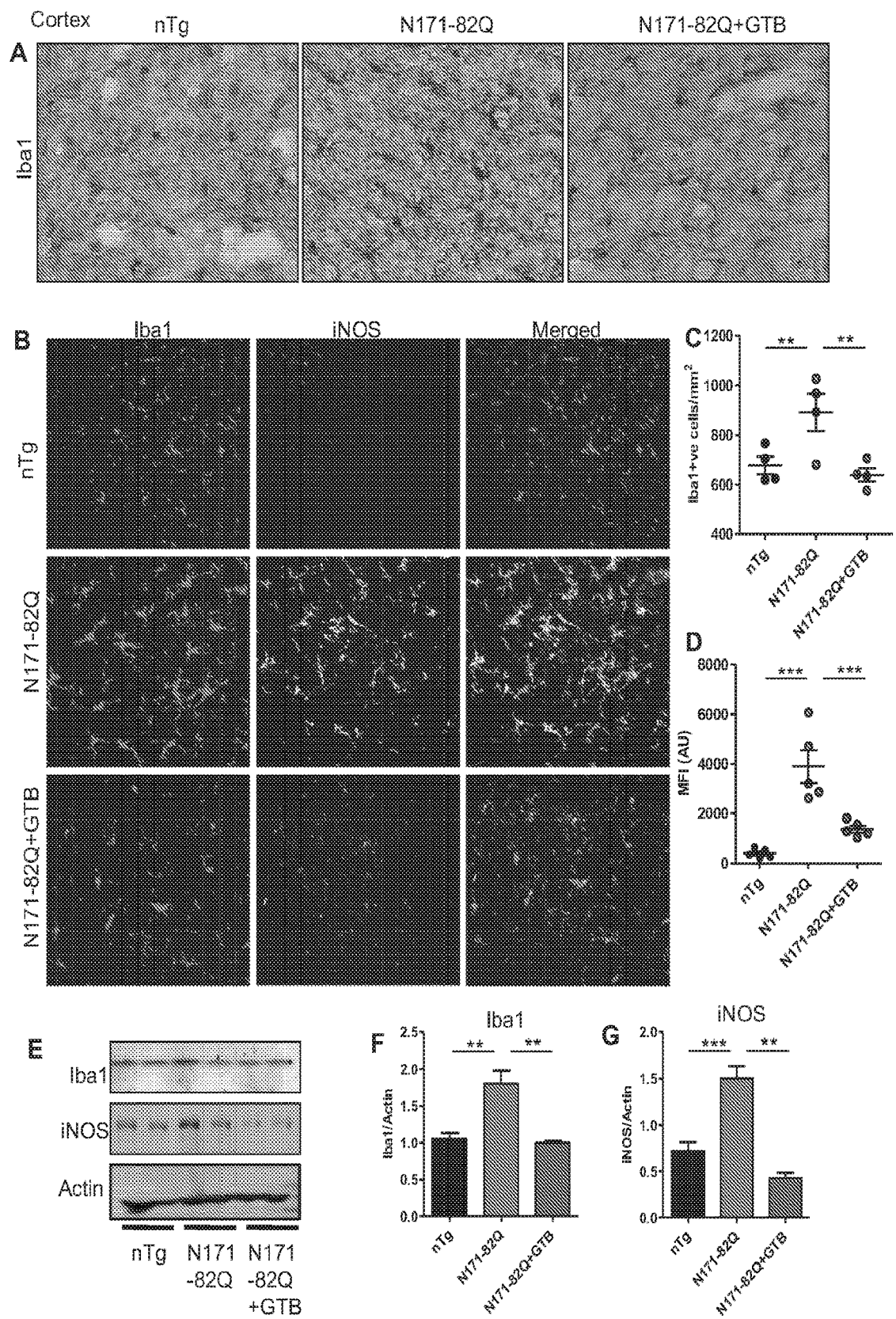
FIG. 4A shows the result of an immunohistochemistry study.
FIG. 4B shows the results from double-label immunofluorescence study, FIG. 4C counts the number of Iba-1 +ve cells in control mice (nTg), untreated N171-82Q mice, and GTB treated N171-82Q mice.
FIG. 4D depicts the Mean Fluorescence Intensity (MFI) of iNOS in control mice (nTg), untreated N171-82Q mice, and GTB treated N171-82Q mice.
FIG. 4E is the Western blot for Iba-1 and iNOS.
FIGS. 4F and 4G are a quantitative analysis of the Western blot shown in FIG. 4E.

Efficacy of Glyceryl Tribenzoate (GTB) in Reducing Microglial Activation in the Cortex of Huntington Transgenic (N171-82Q) Mice Three-month old transgenic (Tg) mice were treated with glyceryl tribenzoate (about 50 mg/kg body wt/day) via gavage. Control Huntington's disease mice received only 100 µl 0.5% methylcellulose as vehicle. After two months of treatment, microglial activation was monitored in cortical sections by DAB staining (FIG. 4A) and double-label immunofluorescence (FIG. 4B). The results shown in FIGS. 4A-4B represent an analysis of six mice per group.

FIG. 4A shows the result of immunohistochemistry staining using Iba-1 antibody in the cortex of control mice (nTg), untreated N171-82Q mice and GTB treated N171-82Q mice. FIG. 4B shows the results from double-label immunofluorescence and FIG. 4C counts the number of Iba-1 positive ("+ve") cells in control mice (nTg), untreated N171-82Q mice and GTB treated N171-82Q mice. FIG. 4D depicts the Mean Fluorescence Intensity (MFI) of iNOS in control mice (nTg), untreated N171-82Q mice and GTB treated N171-82Q mice. FIG. 4E is the western blot for Iba-1 and iNOS and FIGS. 4F and 4G are a quantitative analysis of the western blot shown in FIG. 4E.

As can be seen in FIGS. 3A-3G and 4A-4G, oral administration of glyceryl tribenzoate reduces microglial activation in the striatum and cortex of Huntington transgenic mice. As evident from Iba-1 immunostaining as well as Iba-1 Western blot, the inventor found microgliosis in the striatum (FIG. 3) and cortex (FIG. 4) of untreated N171-82Q Tg mice. Activated microglia also express inducible nitric oxide synthase (iNOS). Accordingly, the level of iNOS significantly increased in both striatum (FIG. 3) and cortex (FIG. 4) of untreated N171-82Q Tg mice. However, oral GTB treatment significantly inhibited microgliosis as well as the expression of iNOS in both striatum (FIG. 3) and cortex (FIG. 4) of N171-82Q Tg mice.

Example 5

Figure 5:
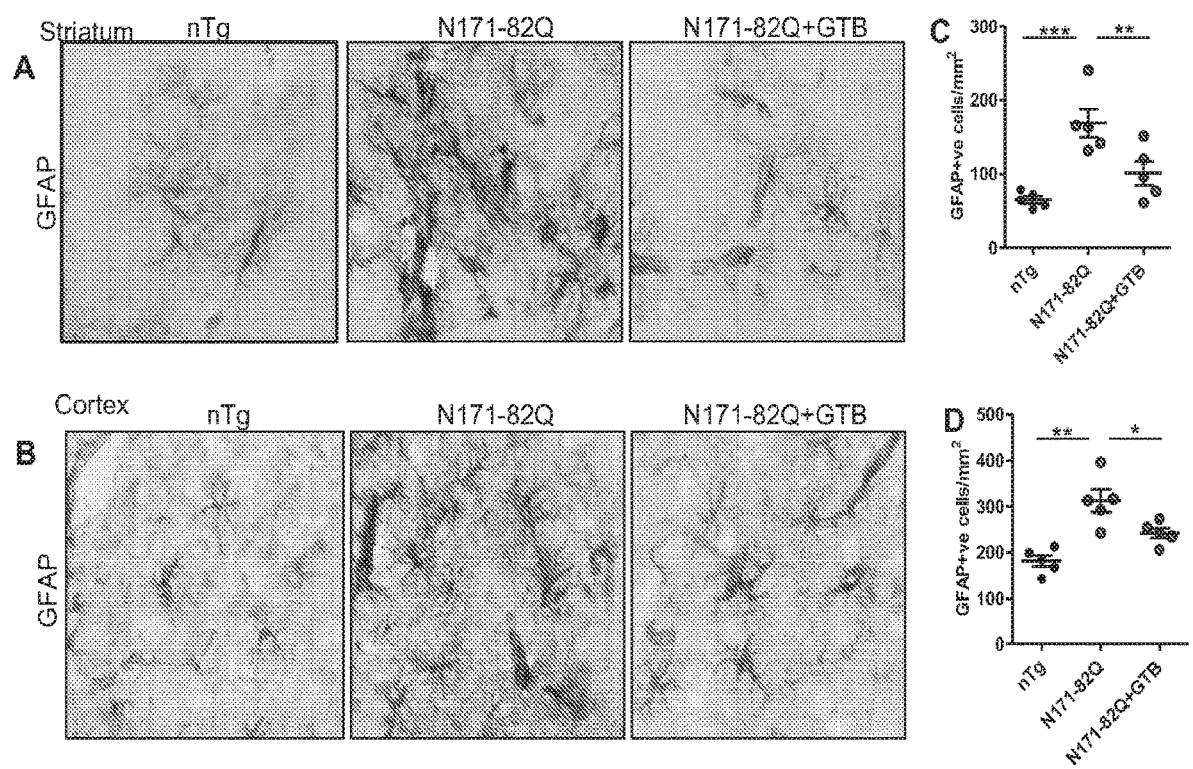
FIGS. 5A and 5B show the result of a DAB staining process and the number of GFAP (+)ve cells were counted in two striatal and cortical sections, as shown in FIGS. 5C and 5D.

Efficacy of Glyceryl Tribenzoate (GTB) in Reducing Astroglial Activation in the Cortex and Striatum of Huntington Transgenic (N171-82Q) Mice Three-month old transgenic (Tg) mice were treated with glyceryl tribenzoate (about 50 mg/kg body wt/day) via gavage. Control Huntington's disease mice received only 100 µl 0.5% methylcellulose as vehicle. After two months of treatment, astroglial activation was monitored in striatal (FIG. 5A) and cortical (FIG. 5B) sections by DAB staining. Further, the number of glial fibrillary acidic protein (GFAP) (+)ve cells were counted in two striatal (FIG. 5C) and cortical (FIG. 5D) sections of each of six mice per group.

Since astroglia are the major cell type in the CNS, any contribution from this cell type would be significant. Therefore, the inventor also monitored astrogliosis in the CNS of N171-82Q Tg mice. Upregulation in GFAP immunostaining in striatum and cortex of N171-82Q Tg mice as compared to non-Tg mice suggested increased astrogliosis in the CNS of N171-82Q Tg mice. However, oral GTB treatment reduced astrogliosis in the CNS of N171-82Q Tg mice. These results suggest that oral GTB is capable of attenuating glial activation and inflammation in the CNS.

Example 6

Oral Administration of Glycerol Tribenzoate (GTB) Reduces Serum Levels of Proinflammatory Cytokines in Huntington Transgenic (N171-82Q) Mice Three-month old Tg mice (n=3 in each group) were treated with GTB (50 mg/kg body wt/d) mixed with 100 µl 0.5% methylcellulose via gavage. Therefore, control HD mice received only 100 µl 0.5% methylcellulose as vehicle. After 1 month of treatment, levels of interleukin-6 (IL-6) and IL-1β were measured in serum by sandwich ELISA.

Figure 6:
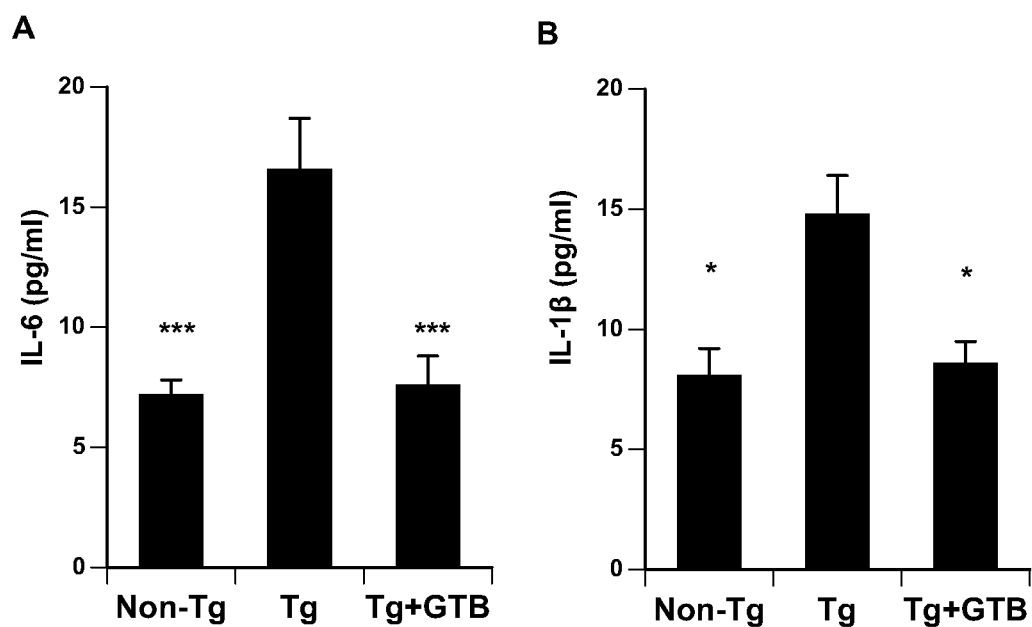
FIGS. 6A and 6B show the results of oral administration of glycerol tribenzoate (GTB) in reducing serum levels of proinflammatory cytokines in Huntington transgenic (N171-82Q) mice.

FIGS. 6A and 6B shows the levels of IL-6 and IL-1β following GTB treatment. Results are mean+SEM of three mice per group. *$p<0.05$; ***$p<0.001$. The results show that GTB significantly decreases the amount of proinflammatory cytokines in the periphery (serum) in Huntington transgenic (N171-82Q) mice.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

The invention claimed is:

1. A method for inhibiting progression of a neurodegenerative disorder, comprising administering to a patient in need thereof an effective amount of a pharmaceutical composition comprising one or both of glyceryl tribenzoate or glyceryl dibenzoate, wherein the administering comprises delivering an inhalation dosage form of the pharmaceutical composition, and wherein the pharmaceutical composition is inhaled by the patient.

2. The method of claim 1, further comprising nebulizing the pharmaceutical composition to create the inhalation dosage form.

3. The method of claim 1, wherein the pharmaceutical composition is administered to the patient in a manner selected from the group consisting of one time per day, two times per day, and three times per day.

4. The method of claim 1, wherein the effective amount is from about 2 mg/kg/day to about 10 mg/kg/day.

5. The method of claim 1, wherein the administering further comprises delivering an oral dosage form of the pharmaceutical composition to the patient.

6. The method of claim 1, wherein the neurodegenerative disorder is Huntington's disease.

* * * * *